(12) United States Patent
Ko et al.

(10) Patent No.: US 7,092,329 B2
(45) Date of Patent: Aug. 15, 2006

(54) PHYSICAL IDENTIFICATION DATA ADDRESSING METHOD USING WOBBLE SIGNAL, WOBBLE ADDRESS ENCODING CIRCUIT, METHOD AND CIRCUIT FOR DETECTING WOBBLE ADDRESS, AND RECORDING MEDIUM THEREFOR

(75) Inventors: Jung-wan Ko, Yongin (KR); In-sik Park, Suwon (KR); Kyung-geun Lee, Seongnam (KR); Du-seop Yoon, Suwon (KR); Seong-sin Joo, Suwon (KR); Jae-seong Shim, Seoul (KR); Byoung-ho Choi, Suwon (KR); Byung-in Ma, Suwon (KR); Young-jin Ahn, Seoul (KR); Tatsuhiro Otsuka, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

(21) Appl. No.: 10/805,360

(22) Filed: Mar. 22, 2004

(65) Prior Publication Data

US 2004/0184372 A1 Sep. 23, 2004

Related U.S. Application Data

(62) Division of application No. 09/704,654, filed on Nov. 3, 2000, now Pat. No. 6,744,718.

(30) Foreign Application Priority Data

Nov. 3, 1999 (KR) .................................. 99-48452
Mar. 25, 2000 (KR) .................................. 00-15328

(51) Int. Cl.
*G11B 7/00* (2006.01)

(52) U.S. Cl. ............................... 369/47.27; 369/275.3; 369/44.13

(58) Field of Classification Search ............. 369/44.13, 369/275.3, 47.1, 47.27, 44.26
See application file for complete search history.

(56) References Cited

U.S. PATENT DOCUMENTS 6,345,018 B1 * 2/2002 Maegawa et al. ........ 369/44.13
6,377,537 B1   4/2002 Maeda et al. ............ 369/44.13

FOREIGN PATENT DOCUMENTS

| CN | 1195171 A  | 10/1998 |
|----|------------|---------|
| EP | 0 838 808 A2 | 4/1998 |
| JP | 7-73508    | 3/1995  |
| JP | 9-279129   | 10/1997 |
| JP | 10-21554   | 1/1998  |
| JP | 10-21555   | 1/1998  |

(Continued)

*Primary Examiner*—Nabil Hindi
(74) *Attorney, Agent, or Firm*—Stein, McEwen & Bui, LLP

(57) ABSTRACT

A physical identification data (PID) addressing method using a wobble signal, a wobble address encoding circuit, a method and circuit for detecting the wobble address and a recording medium therefor. Groove tracks are classified into odd groove tracks and even groove tracks. Address information indicating physical identification information is phase modulated using wobble signals having a predetermined phase difference between two adjacent groove tracks, and recorded in each groove track so that address information modulated using the wobble signals having the phase difference of 90° between adjacent two groove tracks can be a quadrature phase shift keying (QPSK) signal. Accordingly, a larger amount of data can be recorded on the recording medium, and since an interval in which a wobble signal disappears is not caused, recovery of a wobble clock signal can be advantageously performed.

35 Claims, 10 Drawing Sheets

FOREIGN PATENT DOCUMENTS

| | | | | |
|---|---|---|---|---|
| JP | 10-069646 | * 10/1998 | ................ | 369/47.1 |
| JP | 10-312541 | 11/1998 | | |
| JP | 11-7660 | 1/1999 | | |
| JP | 11-149644 | 6/1999 | | |
| JP | 2000-40260 | 8/2000 | | |
| JP | 2001-143272 | 5/2001 | | |
| JP | 2001-143273 | 5/2001 | | |
| JP | 2001-167446 | 6/2001 | | |
| WO | 98/13823 | 4/1998 | | |
| WO | WO 99/13463 | 3/1999 | | |
| WO | WO 99/34359 | 7/1999 | | |

* cited by examiner

| SM | PID#n | PID#n | PID#n | SM | PID#n+1 | PID#n+1 | PID#n+1 |
|----|-------|-------|-------|----|---------|---------|---------|
| SM |       |       |       | SM |         |         |         |
| SM | PID#n+2m | PID#n+2m | PID#n+2m | SM | PID#n+2m+1 | PID#n+2m+1 | PID#n+2m+1 |

ODD GROOVE ADDRESS DETECTED FROM ODD GROOVE TRACK

ODD GROOVE ADDRESS DETECTED FROM LAND TRACK

EVEN GROOVE ADDRESS DETECTED FROM LAND TRACK

EVEN GROOVE ADDRESS DETECTED FROM EVEN GROOVE TRACK

PHYSICAL IDENTIFICATION DATA ADDRESSING METHOD USING WOBBLE SIGNAL, WOBBLE ADDRESS ENCODING CIRCUIT, METHOD AND CIRCUIT FOR DETECTING WOBBLE ADDRESS, AND RECORDING MEDIUM THEREFOR

CROSS-REFERENCE TO RELATED APPLICATIONS

This application is a divisional of application Ser. No. 09/704,654, filed Nov. 3, 2000, now U.S. Pat. No. 6,744,718.

This application claims the benefit of Korean Application Nos. 99-48452, filed Nov. 3, 1999 and 00-15328, filed Mar. 25, 2000, in the Korean Patent Office, the disclosures of which are incorporated herein by reference.

BACKGROUND OF THE INVENTION

1. Field of the Invention

The present invention relates to optical recording/playback, and more particularly, to a physical identification data (PID) addressing method using a wobble signal, a wobble address encoding circuit, a method and circuit for detecting the wobble address, and a recording medium in a high density optical recording and reproducing system.

2. Description of the Related Art

Information used for physical location recognition to determine a location to which data is written on a disc in an optical recording and reproducing system is referred to as physical identification data (PID). Generally, PID is address information of a physical sector in a recording and reproducing medium on which data is recorded in units of sectors. This is essential information for recording data at a certain location on a disc and finding the location at a later time.

In other words, PID indicates address information for finding a specified sector to record/reproduce data to/from a certain location, particularly in a recording and reproducing disc, and indicates address information of a sector which is pre-mastered during manufacture of a disc regardless of existence or non-existence of user data. Accordingly, PID is supposed to be resistant to errors and have a structure allowing fast detection in order to exactly and quickly find the location of a sector which data will be recorded on or reproduced from.

Various methods of recording PID on a disc can be largely classified into two methods. One method is recording physical location information on a disc by forming embossed pits as used in a read-only optical disc to allow a certain location on the disc to be detected based on the embossed pits. The other method uses a wobble signal which can be obtained by giving some changes to recording tracks on a disc at a predetermined time interval.

An area, which is provided for performing PID addressing using the former method, that is, using embossed pre-pits, is referred to as a header field, as shown in FIG. 1. According to a digital versatile disc (DVD) specification for rewritable disc (2.6 or 4.7 gigabytes (GB) DVD-random access memory (RAM)) version 1.0, physical location information is recorded at the location of the so called header field, which comprises pre-pits, during manufacture of a substrate. The header field includes a variable frequency oscillator (VFO) area for a phase locked loop (PLL), a PID area to which a sector number is assigned, an ID error detection (IED) area for storing ID error detection information and a postamble (PA) area for setting up an initial state for modulation of data recorded following the header field. In a PID addressing method using pre-pits, such a header field comprising embossed pre-pits is appropriately disposed at the start of a sector to allow a pickup to easily find and move to a desired location using this information. A sector number, sector type and a land track/groove track can be recognized from the addressed information, and even servo control is possible.

In such a PID addressing method using conventional embossed pre-pits, data cannot be recorded in areas in which pits are formed. Therefore, a problem of a decrease in recording density in proportion to the areas where the pits are formed occurs.

To store a large amount of data with a high density, it is necessary to increase a recordable area (a user data area) by decreasing a track pitch and minimizing a non-recordable area (overhead). For this purpose, it is effective to use a wobble signal.

When forming a substrate for a recording disc, grooves are formed along recording tracks on the substrate to allow a certain track to be exactly tracked by a pickup even if data is not recorded on the track. The portions other than the grooves are referred to as lands. Recording methods can be classified into a method of recording data on either a land or a groove and a method of recording data on both the land and the groove. It is more advantageous to use the land and the groove recording method in which data is recorded on both the land and the groove as the density of data increases.

In addition, a method of generating a signal of a specified frequency by varying both walls of a groove to use it as an auxiliary clock signal during recording is used. This signal is referred to as a wobble signal. A wobble signal having a single frequency is also recorded in the substrate of a DVD-RAM disc.

In a PID addressing method using a wobble signal, overhead information such as a PID signal can be recorded by varying a wobble signal having a single frequency, for example, periodically varying the phase or frequency of the wobble signal, during recording. Here, the PID signal embedded in the wobble signal is generally referred to as a wobble address.

Since the conventional PID addressing method using a wobble signal uses the variation of both walls of a groove track in which a wobble will be recorded, as shown in FIG. 2, the method can be used only in discs employing a land recording method in which information is not recorded in groove tracks. In other words, when using changes in both walls of each groove track, address information of two groove tracks at both sides of a land track can be mixed with each other, so that exact information cannot be obtained from the land track. Accordingly, both the addresses of a land track and a groove track cannot be indicated just by using a wobble address formed in the groove track. Therefore, it is difficult to use the conventional method in discs employing a land and groove recording method in which information is recorded in both land and groove tracks.

Although a wobble address is recorded in the side wall of a groove track at the boundary between a land track and the groove track, information of wobbles formed in both walls of the land and groove tracks is simultaneously read when the land and groove recording method of recording information in land and groove tracks is used. Accordingly, a PID signal cannot be exactly recorded or detected when using the wobble addressing method shown in FIG. 2.

To solve this problem, a method of recording a wobble address in only one wall of each groove track is proposed, as shown in FIG. 3. In this wobble addressing method, however, since a wobble signal is generated from only one sidewall of a groove track, the strength of the signal decreases. In addition, since the same signal is read from the groove track and an adjacent land track, additional information for discriminating a land track from a groove track is required.

SUMMARY OF THE INVENTION

To solve the above problems, a first object of the present invention is to provide a new physical identification data (PID) addressing method using a wobble to solve an overhead problem of an addressing method using embossed pre-pits, and to solve a problem of a conventional wobble addressing method being incompatible with a land and groove recording method.

A second object of the present invention is to provide a method of addressing a PID using variation in either wall of a groove track or a land track such that a bi-phase shift keying (BPSK) signal is obtained in a groove track by phase modulating an address signal using the phase difference between wobbles of adjacent groove tracks, and a quadrature phase shift keying signal is obtained by summing the address signals of the adjacent two groove tracks.

A third object of the present invention is to provide a method of detecting address information from a recording medium in which address information indicating physical identification information is phase modulated in a groove track (or land track) using a wobble having a predetermined phase difference to a wobble formed in an adjacent groove track.

A fourth object of the present invention is to provide a wobble address encoding circuit for a high density optical disc recording and reproducing system.

A fifth object of the present invention is to provide a wobble address detecting circuit for a high density optical disc recording and reproducing system.

A sixth object of the present invention is to provide a recording medium in which address information indicating physical identification information is phase modulated in a groove track (or land track) using a wobble having a predetermined phase difference to a wobble formed in an adjacent groove track.

Additional objects and advantages of the invention will be set forth in part in the description which follows and, in part, will be obvious from the description, or may be learned by practice of the invention.

To achieve the above objects, the present invention provides a method of addressing physical identification information using wobble signals on an optical recording medium. The method includes phase modulating wobble address information indicating the physical identification information using the wobble signals and recording the phase modulated wobble address information in either of a groove track and a land track, wherein the wobble address information is recorded using the wobble signals having a predetermined phase relation so that the wobble address information can be read from a track in which the wobble address information is not recorded.

The present invention also provides a method of detecting a wobble address from an optical recording and reproducing medium, in which wobble address information indicating physical identification information is phase modulated using wobble signals having a predetermined phase relation and recorded in either a groove track or a land track, in an optical recording and reproducing system having an optical detecting device. The method includes providing first and second output signals, each having an original signal and a harmonic component, by multiplying the difference signal between radially half-divided detection signals of the optical detecting device by the wobble signals having the predetermined phase relation, respectively; and removing the harmonic component from the first and second output signals and recovering groove address information and land address information from the original signals.

The present invention also provides a circuit for encoding an address using a wobble in an optical recording and reproducing system. The circuit includes a provider which provides a first wobble signal and a second wobble signal which has a predetermined phase relation with the first wobble signal, and a phase modulator which phase modulates address information indicating physical identification information using the first wobble signal with respect to one of adjacent odd and even tracks, which are defined by classifying groove tracks or land tracks into odd tracks and even tracks, and phase modulates address information using the second wobble signal with respect to the other track.

The present invention also provides a circuit for detecting a wobble address from an optical recording medium, in which wobble address information indicating physical identification information is phase modulated using wobble signals having a predetermined phase relation between adjacent even and odd tracks, which are defined by classifying groove tracks or land tracks into odd tracks and even tracks, and recorded in either a groove track or a land track, in an optical recording and reproducing system having an optical detecting device. The circuit includes a wobble clock recoverer which detects a first wobble clock signal using a difference signal (the push-pull signal) between radially half-divided detection signals of the optical detecting device and providing a second wobble clock signal having the predetermined phase relation with the detected first wobble clock signal; and a phase demodulator which recovers address information from the push-pull signal using the first and second wobble clock signals.

The present invention also provides a recording medium employing a groove/land recording method. The recording medium includes groove tracks classified into odd tracks and even tracks in which wobble address information indicating physical identification information is phase modulated using wobble signals having a predetermined phase relation, and recorded, and land tracks having quadrature phase shift keying (QPSK)-modulated wobble address information obtained from the wobble address information of two adjacent groove tracks.

BRIEF DESCRIPTION OF THE DRAWINGS

The above object and advantage of the present invention will become more apparent by describing in detail preferred embodiments thereof with reference to the attached drawings in which.

DETAILED DESCRIPTION OF THE INVENTION

Hereinafter, a physical identification data (PID) addressing method using a wobble signal, a wobble address encoding circuit, a method and circuit for detecting the wobble address, and a recording medium therefor will be described with reference to the accompanying drawings, in which preferred embodiments of the invention are shown.

When reading a wobble address, which is formed using both sidewalls of a groove track, from a land track, a signal is read from the wall of each of the groove tracks at both sides of the land track, so that the signals from the adjacent walls of adjacent grooves are combined. To process this combined signal not allowing interference of a wobble signal between adjacent tracks, the present invention provides a PID addressing structure using a wobble, as shown in FIG. 4.

Figure 1:
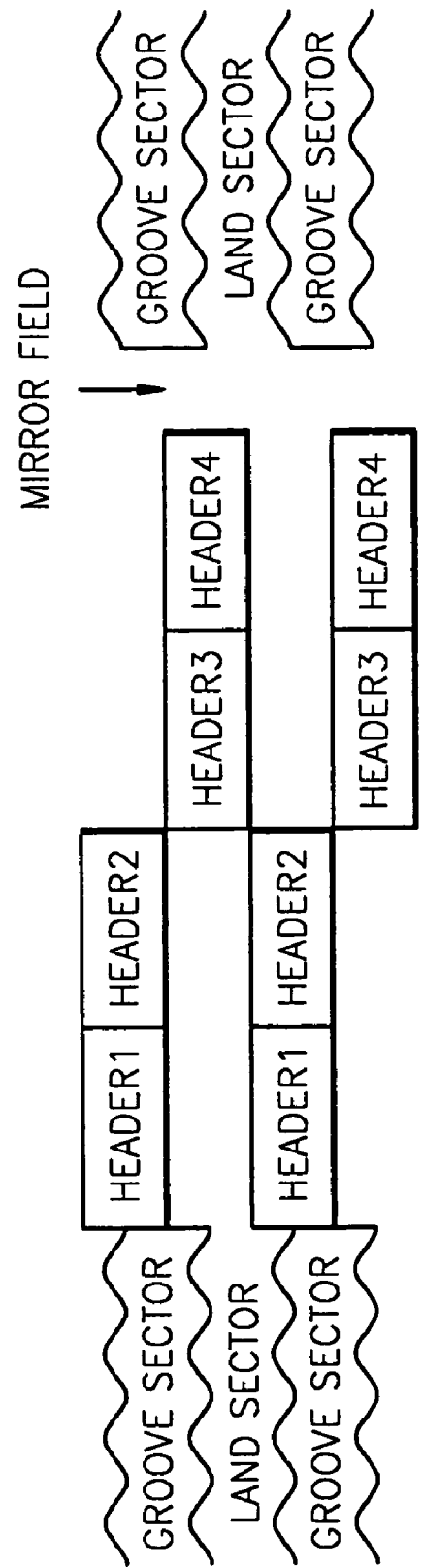
FIG. 1 is a diagram showing a physical identification data (PID) addressing structure using conventional embossed pre-pits.
Figure 2:
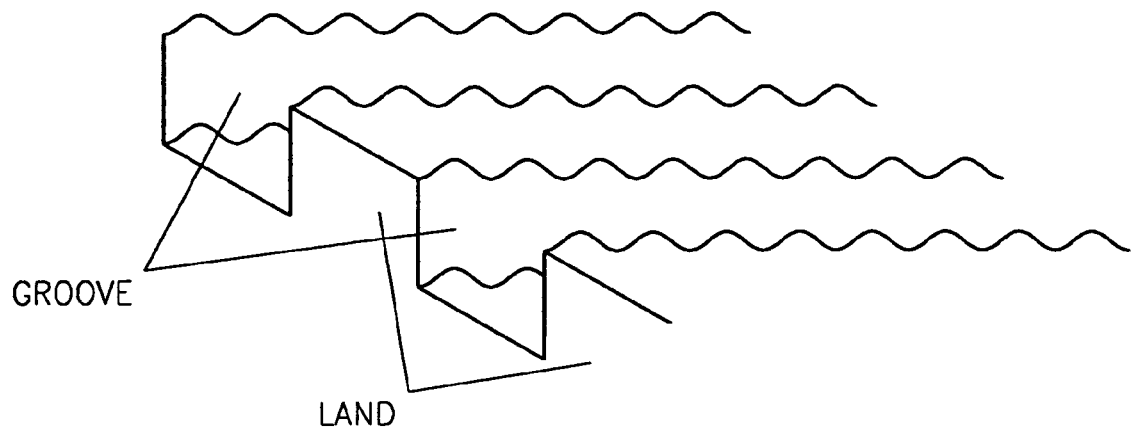
FIG. 2 shows a conventional example in which wobbles are recorded in groove and land tracks.
Figure 3:
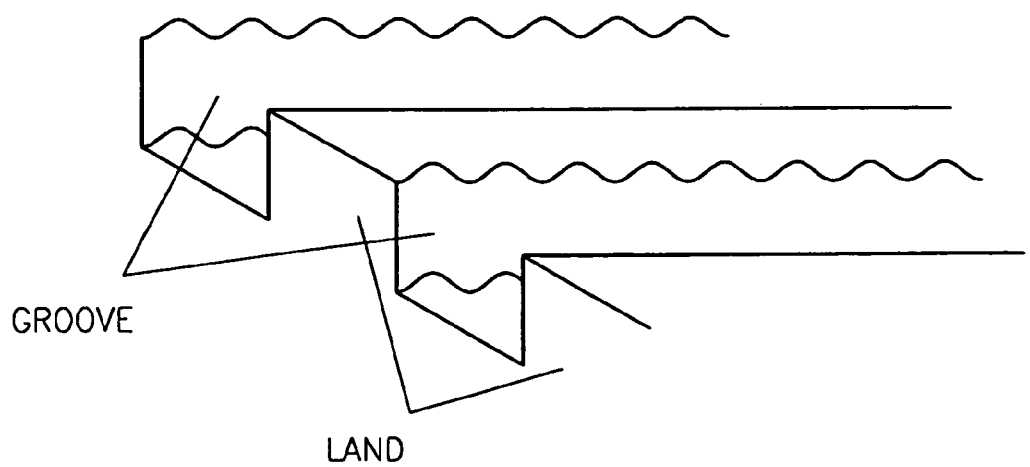
FIG. 3 is a conventional example in which a wobble address is recorded in one wall of a groove track.
Figure 4:
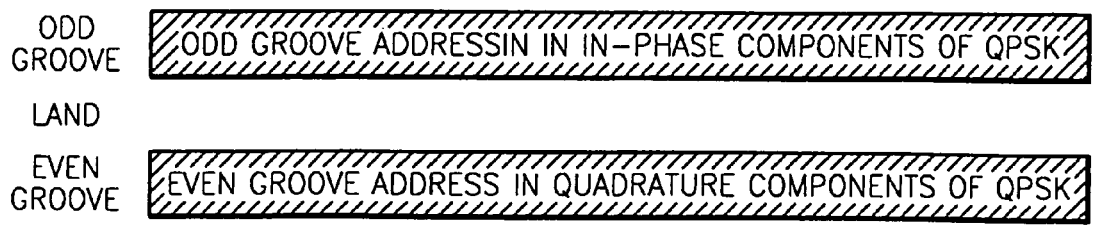
FIG. 4 is a diagram showing a PID addressing structure in which a wobble address is recorded according to the present invention.

FIG. 4 is a diagram showing a PID addressing structure using wobbles recorded in both walls of a groove track according to an embodiment of the present invention. This structure is applied to a disc in which physical locations on land and groove tracks are to be individually accessed, for example, a disc employing a land and groove recording method, in which tracks are formed to have a constant angular velocity such as a zoned constant linear velocity (ZCLV) or a constant angular velocity (CAV) between adjacent tracks. Here, since the variations in the walls of a groove are always the same, a single beam can be used during mastering.

Address data is modulated in a groove track using phase modulation. When an address data bit is "0", a wobble signal having a phase of 0 degrees is recorded, and when an address data bit is "1", a wobble signal having a phase of 180 degrees is recorded. In this case, groove tracks are classified into odd groove tracks and even groove tracks. In one embodiment, for the phase of a wobble clock signal, a carrier having a phase of 0 degrees may be used for odd groove tracks, and a carrier having a phase shifted by 90 degrees may be used for even groove tracks. In another embodiment, a carrier having a phase of 0 degrees may be used for even groove tracks, and a carrier having a phase shifted by 90 degrees may be used for odd groove tracks.

In addition, when a single beam is used, the address of a groove track is recorded on both walls of the groove track so that a land track can indirectly be addressed using the address of an adjacent groove track and the number of sectors per track in a corresponding area, in the case of using the ZCLV. When using the ZCLV, the number of sectors per track is predetermined so that a present sector address can be known from the sector address of an adjacent track.

Figure 5:
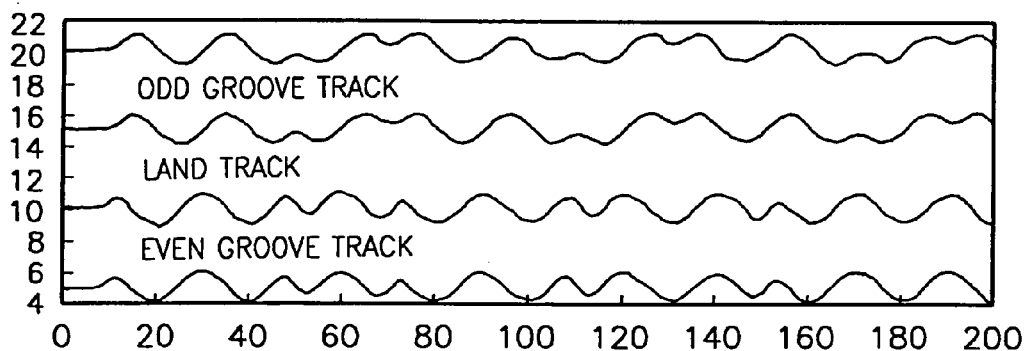
FIG. 5 is a diagram showing waveforms of a wobble signal in land and groove tracks in the structure shown in FIG. 4.

Examples of the waveforms of wobble signals in land and groove tracks in the structure shown in FIG. 4 are shown in FIG. 5. When address data is "0b", a wobble signal having a phase of 0 degrees is recorded. When address data is "1b", a wobble signal having a phase of 180 degrees is recorded.

Accordingly, a signal read from each land track is a quadrature phase shift keying (QPSK)-modulated signal, in which even groove address information modulated in an in-phase component is combined with odd groove address information modulated in a quadrature component, and a bi-phase shift keying (BPSK)-modulated signal is recorded on each groove track.

In other words, the wobble signal of an odd groove track can be expressed as follows.

$$W_{oddgroove}=a(nT)\cdot\sin(\omega t) \tag{1}$$

where T is the sample period of address data, and a(nT) has an address value "1" or "−1" in a period T depending on each bit value of odd groove address data. The variation period T of the address data exceeds the period 1/f of the wobble signal. Here, f is the frequency of the wobble signal, and $\omega=2\pi f$.

The wobble signal of an even groove track can be expressed as follows.

$$W_{evengroove}=b(nT)\cdot\cos(\omega t) \tag{2}$$

where b(nT) has an address value "1" or "−1" in a period T depending on each bit value of even groove address data.

The wobble signal of a land track can be expressed as follows.

$$W_{land}=a(nT)\cdot\sin(\omega t)+b(nT)\cdot\cos(\omega t) \tag{3}$$

Figure 6:
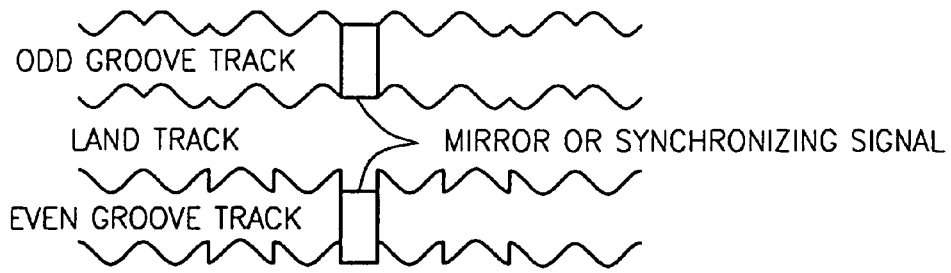
FIG. 6 is a diagram showing a track structure in which a mirror or a wobble synchronizing signal for synchronizing the phases of wobble signals at an initial stage is recorded according to the present invention.

Meanwhile, it is very important to detect the initial phase of a wobble signal. Accordingly, it is preferable to record a mirror zone or a synchronizing signal which can synchronize the phases of wobble signals in each sector or in each specified unit, as shown in FIG. 6. This will be more fully described in FIGS. 8 and 9. Additionally, in the case of a complementary allocated pit address (CAPA) method used in DVD-RAMs, a CAPA signal and a variable frequency oscillator (VFO) signal embedded in the CAPA signal can be used as a reference phase signal for a wobble signal.

When detecting a wobble address from a groove track in which PID is addressed using a wobble, a phase-modulated push-pull signal is multiplied by a carrier, that is, a wobble clock signal to detect the phase component of an original signal (address data). In other words, when a phase-modulated signal is multiplied by a carrier, an original signal expressed as a direct current (DC) term and a harmonic component with a doubled frequency are generated.

The wobble signal of an odd groove track, which is expressed as Equation (1), is multiplied by a carrier, sin(ωt), as shown in Equation (4), the multiplied result is low pass filtered, and a harmonic component is removed from the filtered result, thereby allowing an original component to be detected.

$$a(nT)\sin(\omega t)\cdot\sin(\omega t)=\frac{1}{2}a(nT)-\frac{1}{2}a(nT)\cdot\cos(2\omega t) \tag{4}$$

The wobble signal of an even groove track, which is expressed as Equation (2), is multiplied by a carrier, $\cos(\omega t)$, as shown in Equation (4), the multiplied result is low pass filtered, and a harmonic component is removed from the filtered result, thereby allowing an original component to be detected.

$$b(nT)\sin(\omega t) \cdot \cos(\omega t) = \frac{1}{2}b(nT)\sin(2\omega t) \qquad (5)$$

An odd groove address is detected by multiplying the QPSK-modulated wobble signal of a land track, which is expressed as Equation (3), by a carrier, $\sin(\omega t)$, as shown in Equation (6), low pass filtering the multiplied result, and removing a harmonic component from the filtered result to detect an original component. Simultaneously, an even groove address is detected by multiplying the wobble signal of the land track by a carrier, $\cos(\omega t)$, low pass filtering the multiplied result, and removing a harmonic component from the filtered result to detect an original component.

$$a(nT)\sin(\omega t)\cdot\sin(\omega t) + b(nT)\cos(\omega t)\cdot\sin(\omega t) = \qquad (6)$$
$$\frac{1}{2}a(nT) - \frac{1}{2}a(nT)\cos(2\omega t) + \frac{1}{2}b(nT)\cdot\sin(2\omega t)$$
$$a(nT)\sin(\omega t)\cdot\cos(\omega t) + b(nT)\cos(\omega t)\cdot\cos(\omega t) =$$
$$\frac{1}{2}a(nT)\sin(2\omega t) + \frac{1}{2}b(nT) + \frac{1}{2}b(nT)\cos(2\omega t)$$

That is, detection of an address in a groove track is equal to decoding of a bi-phase modulated signal. However, this is not applied to land tracks. For example, assuming that odd and even groove and land tracks are arranged such that, with respect to the radial direction of a disc, an innermost groove track is referred to as a first odd groove track, the next groove track is referred to as a first even groove track, a land track between the first odd and even groove tracks is referred to as a first odd land track, and the next land track is referred to as a first even land track. In this case, a lower address, that is, the address in an in-phase component of an odd groove track located inside an odd land track is read from the odd land track, while a higher address, that is, the address in an in-phase component of an odd groove track located outside the even land track is read from the even land track. However, the address in a quadrature component of the even groove between adjacent odd and even land tracks is read from the odd and even land tracks.

Since the shape of a wobble formed in one wall of a land track is different from that of a wobble formed in the other wall of the land track, and the phase difference between these different wobbles is 90°, a wobble signal read from the land track spontaneously becomes a QPSK signal. Therefore, the land address can be detected by using an appropriate wobble clock signal ($\sin(\omega t)$ or $\cos(\omega t)$).

In addition, when the period of address information with respect to that of a carrier is synchronized in a simple ratio such as 1:1 or 1:2, a synchronous detection method of simply detecting the phase of a signal can be used. The synchronous detection method extracts the phase of a signal by multiplying a phase-modulated signal by a carrier and then detecting only the size of a signal at a predetermined time interval, instead of low pass filtering the signal. Such a method of detecting a PSK signal is widely known, and thus a detailed description thereof will be omitted.

The PID structure of a wobble signal using the variation in both walls of a groove track according to the present invention will now be more fully described.

It is preferable that address information on a single sector is repeated three times or more. For PID information, the amount of address information to be processed is much smaller than the size of the error correction code (ECC) block of usual user data so that ECC efficiency decreases and the possibility of erroneous correction increases. Accordingly, it is more effective to repeatedly record PID information than to increase the number of bits for error correction. It is typical to use an error detection code (EDC) for error correction of address information.

In the case of recording PID information by loading the PID information on a wobble by way of phase modulation according to the present invention, when a wobble signal is made to have a regular period, the physical length of a sector increases as the size of the sector increases, so that more periods of a wobble signal can be recorded. Accordingly, the size of the PID information increases. On the other hand, when the size of a sector is too large, the minimum recording unit of data also becomes too large, resulting in inefficiency.

It is preferable that the size of a sector is as close to the size of an ECC block as possible. An ECC processing unit is a minimum recording unit. When the size of a sector is set to be smaller than the size of an ECC block, all sectors constituting an ECC block including a sector, in which information will be recorded or modified, should be read, and, after recording/modification of data, ECC information should be updated. As described above, a recording process requires a complex read-modify-write procedure.

For reference, existing 4.7-GB DVD-RAMs are composed of 32-kilobyte (Kbyte) ECC blocks and 2-Kbyte sectors. The length of the recordable field of a sector is 41072 channel bits.

However, it is preferable to increase the size of a sector used in 4.7-GB DVD-RAMs for high density recording. In the case of high density recording, the size of a correctable error decreases compared to the existing 4.7-GB DVD-RAMs when the size of an ECC processing unit is not increased, so it is preferable to increase the size of the ECC processing unit to ensure that the size of a correctable error is the same as that required in the existing 4.7-GB DVD-RAMs. Accordingly, it is preferable to increase the size of a sector to, for example, 4, 8 or 16 Kbytes. When the size of a sector is set to 4 Kbytes, and when existing overhead information is maintained as it is, the number of channel bits per sector is 82144.

When the period of channel data to be recorded is represented by Ts, the period of a wobble signal is represented by Tw, and the period of PID data is represented by Tpid, the following description concerns the effects resulting from changes in these periods.

The period Ts of channel data determines a recording density on a disc. As the period Tw of a wobble signal increases, the frequency of the wobble signal decreases, and the wobble signal closes to or invades the band of a servo signal such as a tracking error signal. On the other hand, as the period Tw of a wobble signal decreases, the frequency of the wobble signal increases, and the wobble signal closes to or invades a radio frequency (RF) signal band at which user data is recorded. Accordingly, it is essential to appropriately set the band of a wobble signal. In the present invention, the period Tw of a wobble signal is larger than 50Ts and smaller than 450Ts (50Ts<Tw<450Ts). For reference, the period Tw of a wobble signal is set to 186Ts in 4.7-GB DVD-RAMs.

The period Tpid of PID data determines the bandwidth of a modulated signal when the PID data is modulated using a wobble carrier. When the period Tpid of PID data is the same as the period Tw of a wobble signal (Tpid=Tw), and when the frequency of the wobble signal is represented by fw, the bandwidth of the modulated signal is 2fw. When the period Tpid of PID data is double the period Tw of a wobble signal (Tpid=2Tw), and when the frequency of the wobble signal is represented by fw, the bandwidth of the modulated signal is fw. The period Tpid of PID data increases, the bandwidth of a modulated signal decreases, thereby decreasing interference with peripheral signals. However, as the period Tpid increases, the efficiency of a modulated signal decreases, and the amount of recordable PID data decreases. Accordingly, it is preferable that $1.5Tw \leq Tpid < 8Tw$.

Figure 7A:
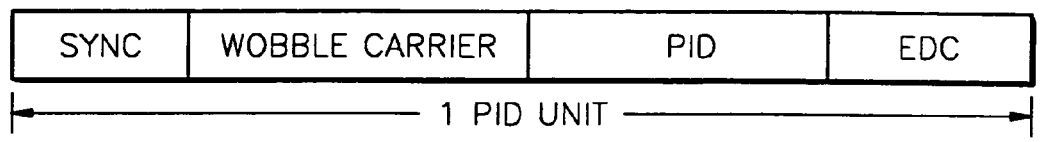
FIGS. 7A through 7C show an example of the contents of the PID addressing structure shown in FIG. 4.
Figure 7B:
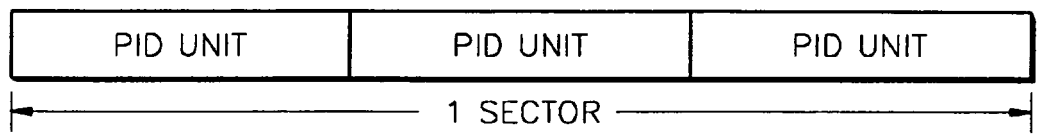
Figure 7C:
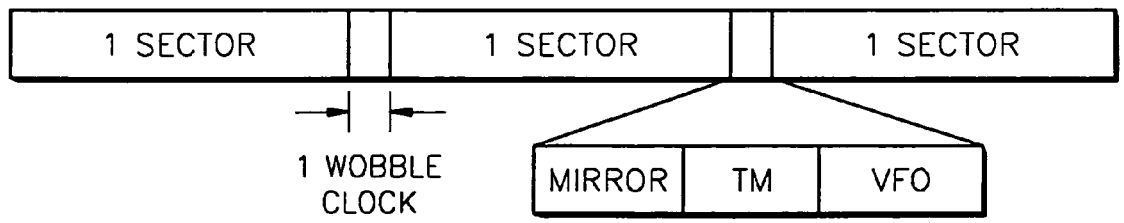

FIGS. 7A through 7C are diagrams showing an example of the contents of a wobble PID according to the PID addressing structure of FIG. 4. As shown in FIG. 7A, a PID unit comprises a wobble sync having synchronization information for determining the start position of a wobble PID signal, a wobble carrier comprising a pure wobble signal not including the PID, a PID which is phase-modulated using a wobble carrier having address information, and an EDC. Here, the position of the wobble sync and the position of the wobble carrier are interchangeable.

It is preferable that address data (PID) is repeated at least three times in a sector, as shown in FIG. 7B. This is for enhancing the robustness of the address data against erroneous correction or erroneous detection. Accordingly, it is preferable that the same PID unit including an address is repeated three or more times during a single sector period.

As shown in FIG. 7C, a sector mark for indicating the beginning of a physical sector is provided at the beginning of a sector. The sector mark includes a mirror zone (MIRROR), a track mark (TM) having information on a track in which a corresponding sector is currently located, and a VFO signal (VFO) for PLL of data to be recorded in a corresponding sector, for 1 wobble clock period. The mirror zone is on the path of a recording and reproducing beam on a disc, does not have any signal or information, and just reflects an incident beam with a predetermined reflectance. In this mirror zone, refraction due to a pit, record mark or a land/groove structure does not occur, so that an output signal read from the mirror zone is the strongest.

In a wobble PID structure according to the present invention, synchronization information for detecting the beginning of address information (PID) and detecting the phase of a wobble carrier is provided before the address information in order to prevent a temporary failure in achieving a PLL or a temporary asynchronous clock phase from influencing adjacent address information. It is preferable that synchronization information can be detected after data demodulation as well as when the data has been modulated. Accordingly, in the present invention, synchronization information for address information exists in the form of a wobble sync using a Barker-Code which is a sort of a pseudo-random sequence. A method of constructing and detecting a Barker-Code and a synchronizing signal is disclosed in U.S. Pat. No. 5,511,099, entitled "Passband Sync Block Recovery" and issued to the present applicant, and thus a detailed description thereof will be omitted.

In addition, for data modulated by way of QPSK, various methods, such as a method of recording a burst signal having only a carrier of a fixed period and a method of recording a carrier signal in a pilot tone, are proposed to easily detect a carrier. Particularly, in the case of a wobble PID, it is preferable to insert a burst signal having only a wobble carrier signal at a predetermined interval since it is technically difficult to insert a carrier using a pilot tone method. The pilot tone method is proper when it is applied to systems rarely having a change in frequency. However, it is difficult to equally maintain the phase characteristic of a band pass filter for extracting a pilot tone in systems having changes in frequency due to accompanying mechanical devices so that an exact phase cannot be detected.

Figure 8:
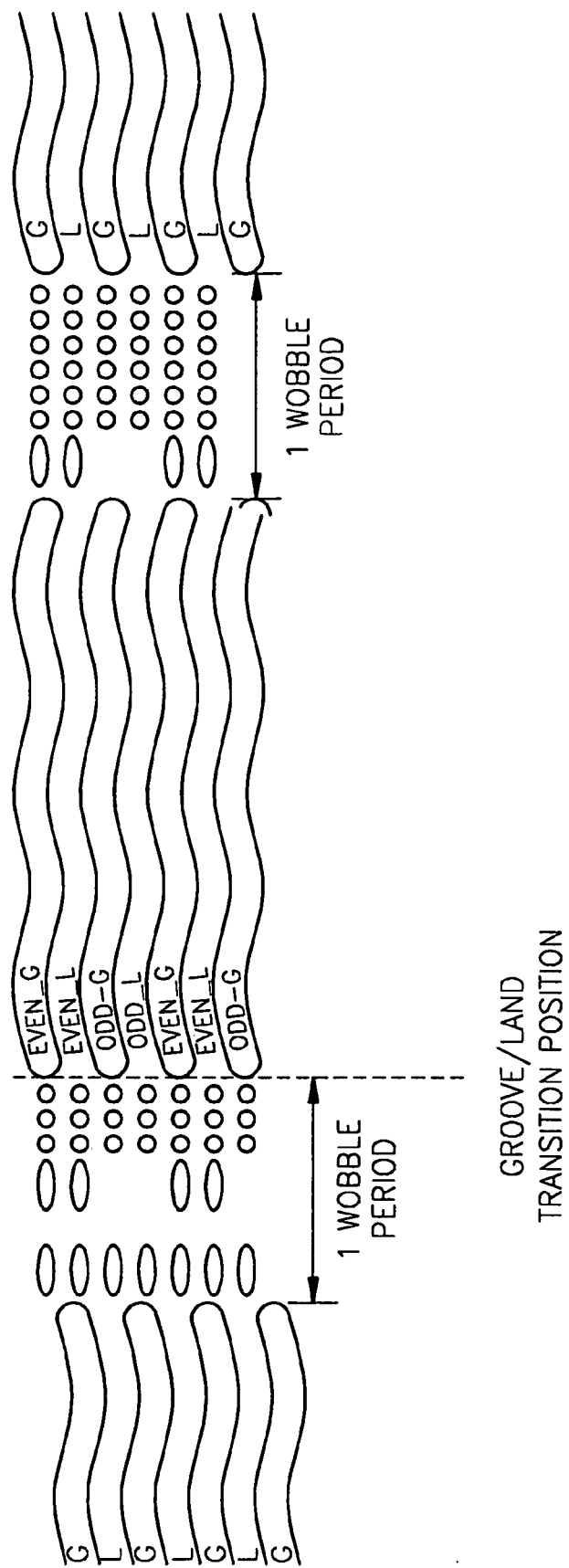
FIG. 8 is a diagram showing a sector mark located at the beginning of a sector and a first sector mark of a track as an example of the track structure shown in FIG. 6.

FIG. 8 is a schematic diagram showing the shapes of a sector mark located at the beginning of a sector and the first sector mark of a track, in the track structure shown in FIG. 6. FIG. 8 shows a first sector mark (a zero sector mark or a reference sector mark), which is located at a transition position from a groove track to a land track or from a land track to a groove track, that is, at the beginning of a track, and a sector mark located at the beginning of a sector. Sector marks are provided to land tracks as well as groove tracks and have different structures in odd tracks and even tracks. The first sector mark of a track has a different structure to the other sector marks of the track.

The sector mark indicates whether a current track to be written to or read from is an even or odd track, and indicates the start point of the corresponding track. According to the structure of the present invention, it is detected whether a current track is an even or odd track or a land or groove track, after demodulation of address data. For groove tracks, an odd groove track is discriminated from an even groove track based on whether data is recovered to a carrier having a phase of 0 degrees or a carrier having a phase of 90 degrees. For land tracks, it can be determined whether currently read information is about an odd or even land track by comparing address information detected from the in-phase component with address information detected from the quadrature component.

When it can be detected whether a current track is an odd or even track or a land or groove track even if address information is normally demodulated and is not read, it can be known whether an address is erroneously read, and a reading rate can be increased.

Figure 9A:
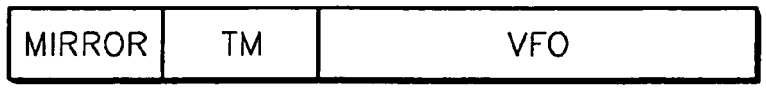
FIGS. 9A through 9E are diagrams showing examples of the contents of the sector mark shown in FIG. 8.
Figure 9B:
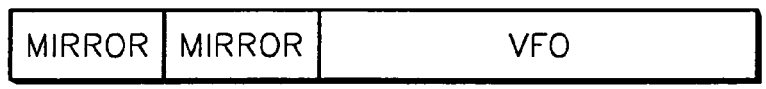

As shown in FIG. 9A, the sector mark of an even groove track or an even land track includes a mirror zone, a track mark and a VFO signal. As shown in FIG. 9B, unlike the sector mark of an even groove track or an even land track, the sector mark of an odd groove track or an odd land track includes a mirror zone instead of a track mark. That is, the sector mark of an odd groove track or an odd land track sequentially includes a mirror zone, another mirror zone and a VFO signal. The sector mark of an even track shown in FIG. 9A may be the sector mark of an odd track shown in FIG. 9B, and the sector mark of an odd track shown in FIG. 9B may be the sector mark of an even track shown in FIG. 9A. Another modification is also possible.

Figure 9C:
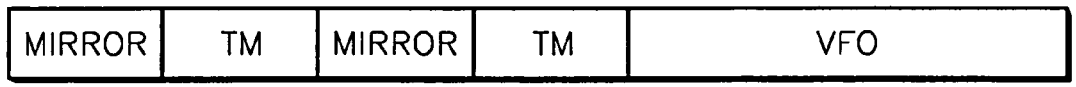

As shown in FIG. 9C, the first sector mark of an even track, which has information on a reference sector indicating the beginning of a track, includes a mirror zone and a track mark in addition to the structure of the sector mark of an even track (FIG. 9A). That is, a mirror zone, track mark, mirror zone, track mark and a VFO signal are sequentially arranged.

Figure 9D:

As shown in FIG. 9D, the first sector mark of an odd track includes a mirror zone and a track mark in addition to the structure of the sector mark of an odd track (FIG. 9B). That is, a mirror zone, track mark, mirror zone, mirror zone and a VFO signal are sequentially arranged. The first sector mark of an even track shown in FIG. 9C can be interchanged with the first sector mark of an odd track shown in FIG. 9D, and another modification is also possible.

Figures 9E, 10:
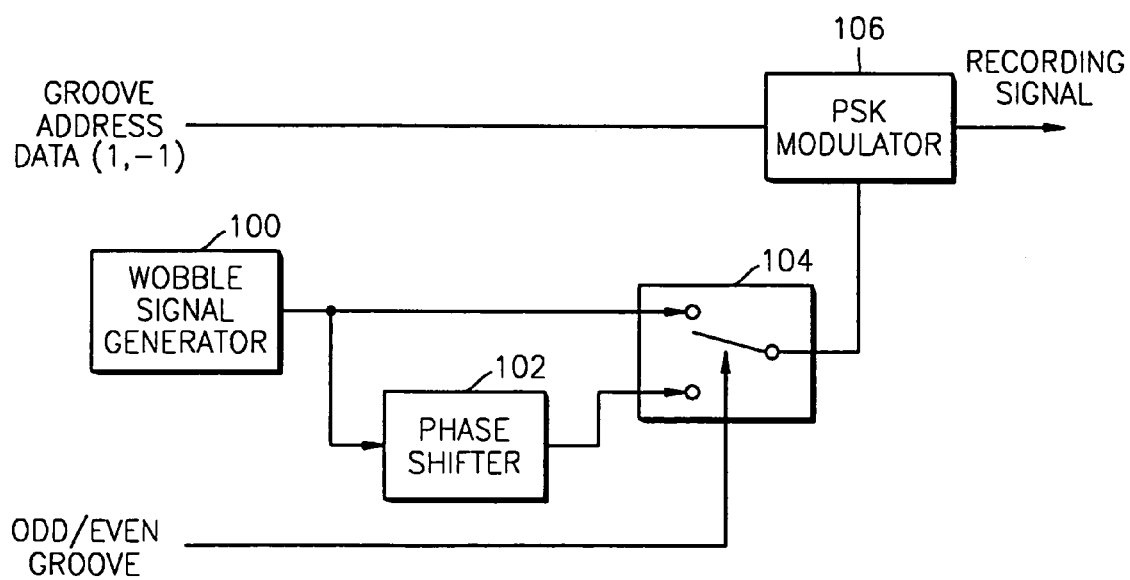
FIG. 10 is a circuit diagram of a wobble address encoding circuit according to an embodiment of the present invention.

FIG. 9E shows a sector mark (SM) and PID structure when each track has m sectors. Sector marks are provided to not only groove tracks but also land tracks, and a PID unit is repeated three times in each groove track.

The following description concerns the generation and detection of a wobble signal using variation in both walls of a groove track according to the present invention.

FIG. 10 is a circuit diagram of a wobble address encoding circuit according to an embodiment of the present invention. The wobble address encoding circuit includes a wobble signal generator 100, a phase shifter 102, a selector 104 and a PSK modulator 106.

In FIG. 10, the wobble signal generator 100 generates a wobble signal having a predetermined wobble frequency fw. The phase shifter 102 shifts the phase of the wobble signal generated by the wobble signal generator 100 by 90° to generate a phase shifted wobble signal.

The selector 104 selects the wobble signal generated by the wobble signal generator 100 in response to an odd groove track signal and selects the phase shifted wobble signal provided by the phase shifter 102 in response to an even groove track.

The PSK modulator 106, which can be manifested as a multiplier, multiplies groove address data of "1" or "−1" by the wobble signal selected by the selector 104. Therefore, a BPSK-modulated signal obtained by multiplying address data by a carrier having a phase of 0°, that is, $\sin(\omega t)$, is recorded on an odd groove track, and a BPSK-modulated signal obtained by multiplying address data by a carrier having a phase of 90°, that is, $\cos(\omega t)$, is recorded on an even groove track.

Figure 11:
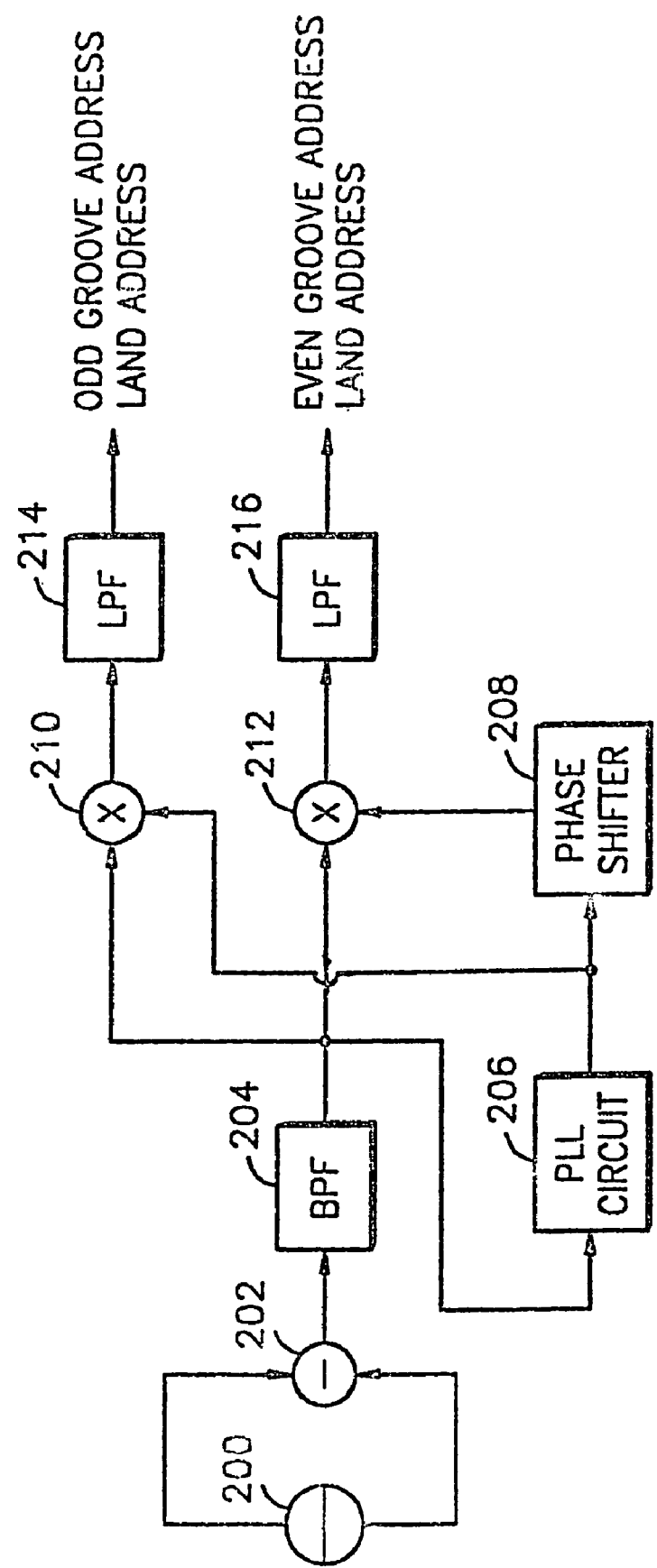
FIG. 11 is a circuit diagram of a wobble address detecting circuit according to an embodiment of the present invention.

FIG. 11 is a circuit diagram of a wobble address detecting circuit according to an embodiment of the present invention. The wobble address detecting circuit includes an optical detecting device 200, a subtractor 202, a band pass filter (BPF) 204, a phase locked loop (PLL) circuit 206, multipliers 210 and 212, and low pass filters (LPFs) 214 and 216.

The subtractor 202 detects a difference signal (a push-pull signal) between the radially half-divided output signals of the optical detecting device 200 which can be manifested as a photodiode. Here, address information is detected from the push-pull signal.

The BPF 204 band filters the push-pull signal. The PLL circuit 206 detects a wobble clock signal from the output of the BPF 204. The phase shifter 208 shifts the phase of the wobble clock signal detected by the PLL circuit 206 by 90° to provide a phase shifted wobble clock signal.

In the case of a BPSK signal or a QPSK signal, a section in which a signal is 0 does not exist during recovery of a wobble clock signal. When the PLL circuit 206 performs full-wave rectification on the push pull signal and obtains 2-multiple-speed clock signal, a nearly complete clock signal can be detected. The PLL circuit 206 detects the wobble clock signal by recovering and half-dividing a 2-multiple-speed wobble clock signal. However, a phase synchronizing signal is required for the 180°-phase of the 2-multiple-speed clock signal in order to solve an ambiguity problem. Accordingly, the wobble sync and the wobble carrier signal shown in FIG. 7A and the VFO signal recorded in the sector mark shown in FIG. 8 are used.

The multiplier 210 multiplies the band-filtered push-pull signal provided by the BPF 204 by the wobble clock signal provided by the PLL circuit 206. Then, an original signal expressed as a DC term and a multiplied harmonic component are generated. That is, an original signal (odd groove address data) and a multiplied harmonic component are generated in an odd groove track, as shown in Equation (4), and an original signal (odd groove address data) and a multiplied harmonic component are generated in an odd groove track, as shown in Equation (6). Here, the address data of an odd groove track inside an odd land track in a radial direction is detected from the odd land track, and the address data of an odd groove track outside an even land track in a radial direction is detected from the even land track.

The multiplier 212 multiplies the band-filtered push-pull signal provided by the BPF 204 by the 90°-phase shifted wobble clock signal provided by the phase shifter 208. Then, an original signal expressed as a DC term and a multiplied harmonic component are generated. That is, an original signal (even groove address data) and a multiplied harmonic component are generated in an even groove track, as shown in Equation (5), and an original signal (even groove address data) and a multiplied harmonic component are generated in an odd groove track, as shown in Equation (6).

The LPF 214 filters the harmonic component of the output of the multiplier 210 to detect an original signal component (a phase component). The LPF 216 filters the harmonic component of the output of the multiplier 212 to detect an original signal component.

In other words, an odd groove address is provided from the LPF 214 in an odd groove track, an even groove address is provided from the LPF 216 in an even groove track, and a land address having an in-phase component and a quadrature component is provided from the LPFs 214 and 216.

Figure 12A:
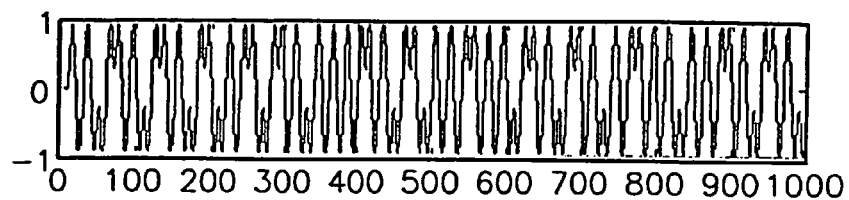
FIGS. 12A through 12K are waveform diagrams showing the waveforms of members of the detecting circuit shown in FIG. 11.
Figure 12B:
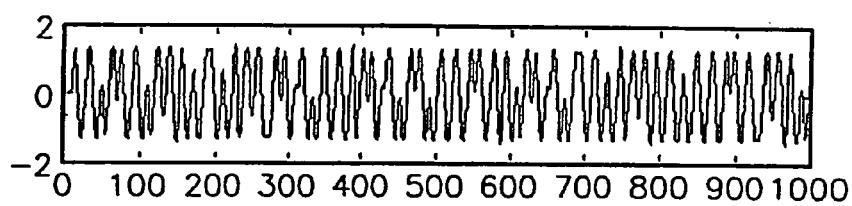
Figure 12C:
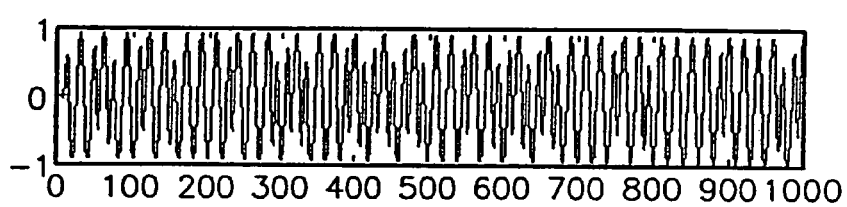

With respect to a wobble signal as shown in FIG. 5, generated in the structure shown in FIG. 4, a signal shown in FIG. 12A which is read from an odd groove track is detected from the push-pull signal of the subtractor 202. A signal shown in FIG. 12B which is read from a land track is detected from the push-pull signal of the subtractor 202. A signal shown in FIG. 12C which is read from an even groove track is detected from the push-pull signal of the subtractor 202.

Figure 12D:
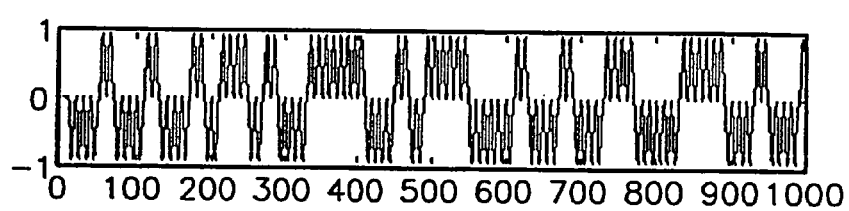
Figure 12E:
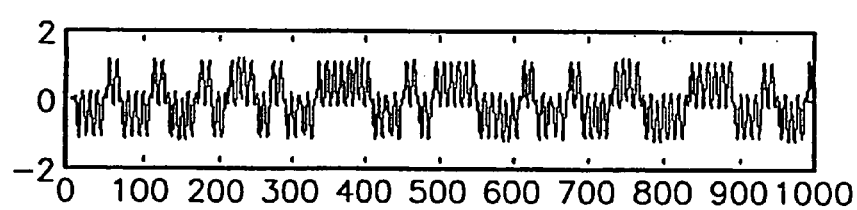
Figure 12F:
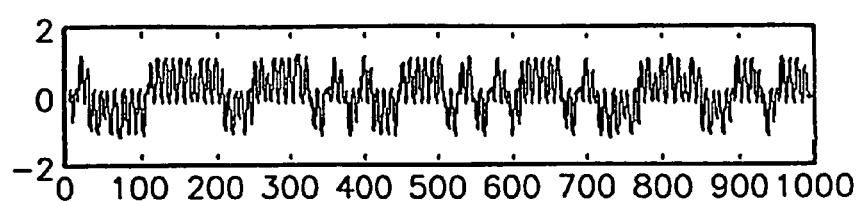
Figure 12G:
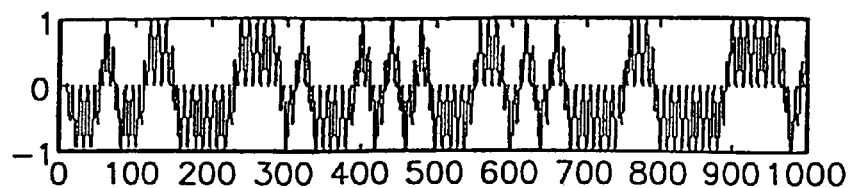

A signal shown in FIG. 12D is output from the multiplier 210 and is the result of multiplying the BPSK-modulated-odd groove track signal of FIG. 12A by $\sin(\omega t)$. A signal shown in FIG. 12E is output from the multiplier 210 and is an in-phase component detected from the result of multiplying the QPSK-modulated land track signal of FIG. 12B by $\sin(\omega t)$. A signal shown in FIG. 12F is output from the multiplier 212 and is a quadrature component detected from the result of multiplying the QPSK-modulated land track signal of FIG. 12B by $\cos(\omega t)$. A signal shown in FIG. 12G is output from the multiplier 212 and is the result of multiplying the signal of FIG. 12C read from an even groove track by $\sin(\omega t)$.

Figure 12H:
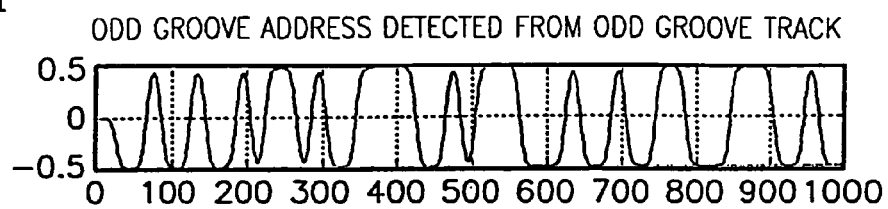
Figure 12I:
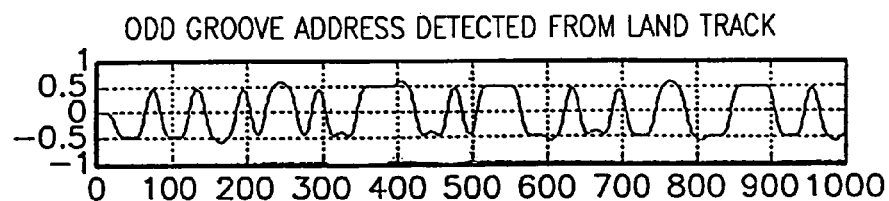
Figure 12J:
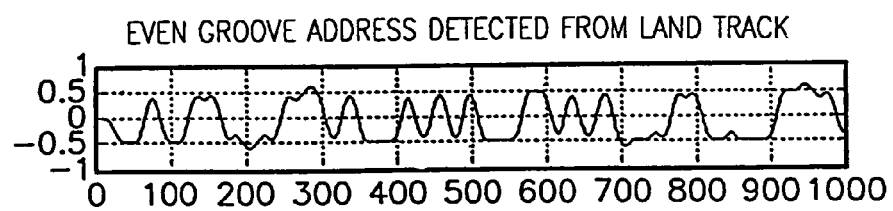
Figure 12K:
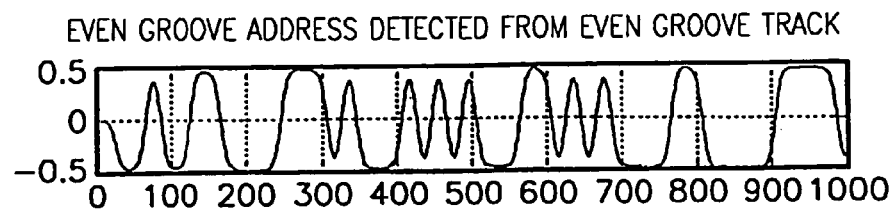

FIG. 12H shows odd groove track address information provided from the LPF 214. FIGS. 12I and 12J show land address information having an in-phase component and land address information having a quadrature component, respectively, that are simultaneously provided by the LPFs 214 and 216. FIG. 12K shows even groove track address information provided by the LPF 216.

The present invention can be effectively applied to high density optical recording and reproducing systems.

In the present invention, not only is one address information recorded in a single area, for example, the address of a sector is recorded in an area corresponding to the single sector in a groove track, but also the address of a corresponding sector in an adjacent land track can be recorded in the sector area. The address of a corresponding sector in an adjacent land track may vary with the length of the sector and the characteristics of a modulated signal. Through such a method, a plurality of addresses can be read while a single sector is being read so that, even if one of groove address information and land address information cannot be read, the address information that cannot be read can be inferred from the address information that is read and other disc information.

As described above, the present invention can solve the overhead problem of a PID addressing method using a conventional embossed pre-pit, and can solve the problem that a conventional wobble address method cannot be applied to a land and groove recording method.

In addition, the present invention records address information in each groove track such that the sum of address information of an odd groove track and address information of an adjacent even groove track, which is modulated using the wobble signals of the adjacent odd and even groove tracks having a phase difference of 90°, is a QPSK signal. Therefore, a larger amount of data can be recorded, and a short period of a wobble signal does not cause a problem. Since a section in which a wobble signal disappears does not exist, the present invention is advantageous in recovering a wobble clock signal.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of recording information on an optical recording medium, the method comprising:
    recording the information on the optical recording medium using wobble carrier signals having a predetermined phase relation using a quadrature phase shift keying method,
    wherein the quadrature phase shift keying method comprises using variations in wobbles in groove tracks of the optical recording medium and recording wobble address data in even and odd ones of the groove tracks using the wobble carrier signals, which have a phase difference of 90 degrees between the even and odd groove tracks.

2. A recording medium employing a groove/land recording method, the recording medium comprising:
    groove tracks classified into odd tracks and even tracks in which wobble address information indicating physical identification information is phase modulated using wobble signals having a predetermined phase relation; and
    land tracks having quadrature phase shift keying (QPSK)-modulated wobble address information obtained from the wobble address information of two adjacent groove tracks.

3. The recording medium of claim 2, wherein the predetermined phase relation is a phase difference between the wobble signals of an odd one of the groove tracks and an adjacent even one of the groove tracks is 90 degrees, and bi-phase shift keying (BPSK)-modulated address information is recorded in each groove track using a single beam.

4. The recording medium of claim 2, wherein the wobble address information comprises address information of a current track, and address information of an adjacent track.

5. The recording medium of claim 2, further comprising an area including information in predetermined units for synchronizing an initial phase of the wobble signals in each groove track.

6. The recording medium of claim 5, wherein the area is a mirror zone.

7. The recording medium of claim 2, wherein the land and groove tracks each comprise minimum recording units, and the wobble address information are repeatedly recorded three or more times in each of the minimum recording units.

8. The recording medium of claim 2, wherein the wobble address information each comprises a wobble sync having synchronization information for determining a beginning of physical identification data (PID), a wobble carrier comprising a pure wobble signal without the PID, the PID being phase modulated with a wobble carrier having address information, and an error detection code.

9. The recording medium of claim 8, wherein a period of the PID is equal to or larger than 1.5 times a period of the wobble carrier and smaller than 8 times the period of the wobble carrier.

10. The recording medium of claim 8, wherein the period of the wobble carrier is larger than 50 times a period of channel data and smaller than 450 times the period of the channel data, the channel data being recorded on the optical recording and reproducing medium.

11. The recording medium of claim 8, wherein the wobble sync is detectable in a modulated state and/or after demodulation.

12. The recording medium of claim 8, wherein the wobble sync comprises a pseudo-random sequence.

13. The recording medium of claim 12, wherein the wobble sync comprises a Barker-Code.

14. The recording medium of claim 2, wherein the groove and land tracks each comprises minimum recording units, and a sector mark is provided at beginning of each minimum recording unit in each track.

15. The recording medium of claim 14, wherein the structures of the sector marks are different in the even groove and land tracks as opposed to the odd groove and land tracks, and the structure of a first sector mark of each track is different from the structure of any of the other sector marks in the same track.

16. The recording medium of claim 15, wherein the sector mark of each of the even groove and land tracks comprises a mirror zone, a track mark having information for discriminating an even track from an odd track, and a variable frequency oscillator (VFO) signal having phase synchronization information, and the sector mark of each of the odd groove and land tracks comprises the mirror zone, another mirror zone and the VFO signal.

17. The recording medium of claim 15, wherein the first sector mark of each of the even groove and land tracks comprises a mirror zone, a track mark, another mirror zone, another track mark and a VFO signal, and the first sector mark of each of the odd groove and land tracks comprises the mirror zone, the track mark, another mirror zone, still another mirror zone and the VFO signal.

18. The recording medium of claim 15, wherein the sector mark of each of the odd groove and land tracks comprises a mirror zone, a track mark having information for discriminating an even track from an odd track, and a variable frequency oscillator (VFO) signal having phase synchronization information, and the sector mark of each of the odd groove and land tracks comprises the mirror zone, another mirror zone and the VFO signal.

19. The recording medium of claim 15, wherein the first sector mark of each of the even groove and land tracks comprises a mirror zone, a track mark, another mirror zone, another track mark and a VFO signal, and the first sector mark of each of the odd groove and land tracks comprises the mirror zone, the track mark, another mirror zone, still another mirror zone and the VFO signal.

20. A method of addressing physical identification data on a recording medium having groove and land tracks, the method comprising:
storing a first bi-phase shift keying (BPSK)-modulated signal in a first wall of one of the groove tracks nearest an adjacent one of the land tracks;
storing a second bi-phase shift keying (BPSK)-modulated signal in a second wall of another one of the groove tracks adjacent to the one land track, wherein the second wall is nearest to the one land track on the other side of the land track from the first wall;
wherein the first and second walls form a quadrature shift keying (QPSK)-modulated signal based on the first and second BPSK-modulated signals, the first and second BPSK-modulated signals represent corresponding groove address information and the QPSK-modulated signal represents land address information.

21. A method of addressing physical identification data on a recording medium having groove and land tracks, the method comprising:
storing a first bi-phase shift keying (BPSK)-modulated signal in a first wall of one of the land tracks nearest an adjacent one of the land tracks; and
storing a second bi-phase shift keying (BPSK)-modulated signal in a second wall of another one of the land tracks adjacent to the one groove track, wherein the second wall is nearest to the one groove track on the other side of the groove track from the first wall;
wherein the first and second walls form a quadrature shift keying (QPSK)-modulated signal based on the first and second BPSK-modulated signals, the first and second BPSK-modulated signals represent corresponding land address information and the QPSK-modulated signal represents groove address information.

22. The method of claim 21, further comprising:
phase shifting the first BPSK-modulated signal by 90 degrees to generate the second BPSK-modulated signal.

23. A recording medium which stores physical identification data, comprising:
land and groove tracks;
wherein the groove tracks each has two walls, one of the two walls of one of the groove tracks nearest an adjacent one of the land tracks stores a first bi-phase shift keying (BPSK)-modulated signal, and one of the two walls of another one of the groove tracks adjacent to the one land track on a side opposite to the one groove track stores a second BPSK-modulated signal, wherein the second wall is nearest to the one land track on the other side of the land track from the first wall; and
wherein the first and second walls form a quadrature shift keying (QPSK)-modulated signal based on the first and second BPSK-modulated signals, the first and second BPSK-modulated signals represent corresponding groove address information and the QPSK-modulated signal represents land address information.

24. The recording medium of claim 23, where the first BPSK-modulated signal is phase shifted from the second BPSK-modulated signal by 90 degrees.

25. A recording medium which stores physical identification data, comprising:
land and groove tracks;
wherein the land tracks each has two walls, one of the two walls of one of the land tracks nearest an adjacent one of the groove tracks stores a first bi-phase shift keying (BPSK)-modulated signal, and one of the two walls of another one of the land tracks adjacent to the one groove track on a side opposite to the one land track stores a second BPSK-modulated signal, wherein the second wall is nearest to the one groove track on the other side of the groove track from the first wall; and
wherein the first and second walls form a quadrature shift keying (QPSK)-modulated signal based on the first and second BPSK-modulated signals, the first and second BPSK-modulated signals represent corresponding land address information and the QPSK-modulated signal represents groove address information.

26. The recording medium of claim 25, where the first BPSK-modulated signal is phase shifted from the second BPSK-modulated signal by 90 degrees.

27. A method of addressing physical identification data on a recording medium having grooves and tracks, the method comprising:
storing a first wobble in one of two walls of one of the groove tracks nearest one of an adjacent one of the land tracks; and
storing a second wobble phase shifted from the first wobble in one of two walls of another one of the groove tracks adjacent to the one land track on a side opposite to the one groove track, wherein the second wall is nearest to the one land track on the other side of the land track from the first wall;
wherein the first and second wobbles together form a quadrature shift keying (QPSK) signal.

28. The method of claim 27, wherein the first and second wobbles represent groove address information and the QPSK signal represents land address information.

29. A method of addressing physical identification data on a recording medium having grooves and tracks, the method comprising:
storing a first wobble in one of two walls of one of the land tracks nearest one of an adjacent one of the groove tracks; and
storing a second wobble phase shifted from the first wobble in one of two walls of another one of the land tracks adjacent to the one groove track on a side opposite to the one land track, wherein the second wall is nearest to the one groove track on the other side of the groove track from the first wall;
wherein the first and second wobbles together form a quadrature shift keying (QPSK) signal.

30. The method of claim 29, wherein the first and second wobbles represent land address information and the QPSK signal represents groove address information.

31. A recording medium which stores physical identification data, comprising:
land and groove tracks;
wherein the groove tracks each has two walls, one of the two walls of one of the groove tracks nearest one of an adjacent one of the land tracks stores a first wobble, one of the two walls of another one of the groove tracks adjacent to the one land track on a side opposite to the one groove track stores a second wobble phase shifted from the first wobble, wherein the second wall is nearest to the one land track on the other side of the land track from the first wall; and wherein the first and second wobbles together form a quadrature shift keying (QPSK) signal.

32. The recording medium of claim 31, wherein the first and second wobbles each represent corresponding groove address information and the QPSK signal represents land address information.

33. A recording medium which stores physical identification data, comprising:

land and groove tracks;

wherein the land tracks each has two walls, one of the two walls of one of the land tracks nearest one of an adjacent one of the groove tracks stores a first wobble, one of the two walls of another one of the land tracks adjacent to the one groove track on a side opposite to the one land track stores a second wobble phase shifted from the first wobble, wherein the second wall is nearest to the one groove track on the other side of the groove track from the first wall; and wherein the first and second wobbles together form a quadrature shift keying (QPSK) signal.

34. The recording medium of claim 33, wherein the first and second wobbles each represent corresponding land address information and the QPSK signal represents groove address information.

35. A method of addressing a PID using variation in either wall of groove tracks or land tracks, comprising:

storing a bi-phase shift keying (BPSK) signal in the groove or land tracks by phase modulating an address signal using the phase difference between wobbles of adjacent corresponding groove or land tracks, so that a quadrature phase shift keying signal is obtained by summing the BPSK signals of two of the adjacent groove or land tracks.

* * * * *